3,355,445
PROCESS OF FINING GELATIN BY MEANS OF CARBONATE PRECIPITATION
Nicholas J. Kalafatas, Arlington, and George A. Consolazio, Burlington, Mass., assignors to General Foods Corporation, White Plains, N.Y., a corporation of Delaware
No Drawing. Filed Mar. 4, 1966, Ser. No. 531,783
5 Claims. (Cl. 260—118)

ABSTRACT OF THE DISCLOSURE

A gelatin solution (or extract) is treated to obtain a clarified, essentially turbidity- and haze-free solution having a reduced content of metallic ions and of organic contaminants by adding to the solution, having a pH of 6.0 or above, an alkali metal or ammonium carbonate, adjusting the pH of the solution to 8.0 to 10.0 (e.g., with an ammonium, alkali metal or alkaline earth metal hydroxide or ammonia) whereby a metallic carbonate is formed which is then separated from the solution together with other coprecipitated and occluded contaminants.

---

This invention relates to the treatment of gelatin. More particularly, it relates to a process of clarifying or fining gelatin to reduce the concentration of metallic ions therein and to lower the level of organic contaminants therein.

During the lengthy and numerous processing steps which are required to recover gelatin from various sources such as pig skins, lime splits and ossein, the source material may be treated with a variety of reagents such as lime, magnesium oxide, barium oxide, caustic soda, hydrochloric acid, sulfuric acid, phosphoric acid, etc. When the cations and anions from such reagents are carried through the later processing steps, the resultant gelatin extract or solution may have poor clarity and may even be turbid. Trace amounts of metallic ions may also be present in the gelatin extract or solution because of the contact of the gelatin source material or the gelatin extract or solution with metallic process equipment surfaces. In addition, water, which is extensively used in gelatin manufacturing processes, may serve to introduce obnoxious and troublesome cations and anions, usually in the form of dissolved salts, into the gelatin extract or solution.

While the amount of the various metallic ions in a gelatin extract or solution may vary widely, even trace amounts of one or all may produce undesirable haze or turbidity. Among the trace metallic ion impurities which may cause problems in obtaining a sparkling, clear gelatin extract or solution are those of the alkaline earth metals, metals of the ion group, the rare earth metals, noble metals and metals of the platinum group. It appears that the problem of poor clarity of a gelatin extract or solution may be caused by insoluble simple or complex inorganic salts of such metallic ion impurities or other cations or metallo protein complexes.

Further, it is generally desirable to have a dried gelatin product with a low ash content, as measured as the oxide, since an ash content above about 2% may frequently cause the gelatin to be rejected for certain uses. However, the presence of alkaline earth metals or other heavy metals is also known to increase the ash content. Thus, many metals whose presence increases the ash content are troublesome also in producing haze or turbidity. Since calcium, like other alkaline earth metals generally may frequently be present as soluble salts, the problem of effectively removing them has long presented itself.

Moreover, various metals, particularly iron and chromium, may also produce undesirable color in the gelatin extract or solution. Further, many of these metals may seriously interfere with the usage of gelatin in certain applications such as, for example, in photographic films, plates, and the like.

Naturally occurring organic materials, their degradation products and their metallo-complexes, particularly those of iron or chromium, also present a clarity problem.

Various prior art techniques have been described for treating or clarifying gelatin extract or solution. However, such prior art methods have certain undesirable characteristics such as long processing times, use of expensive reagents for treatment and special filtration equipment, employment of high temperatures for substantial periods of time, etc. A further disadvantage of several prior art methods is seen in their resulting in degradation of gelatin because of the processing techniques employed, for example, use of very low or very high pH conditions, high temperatures, and the like. Degradation is evidenced by a lowering of the bloom and/or the viscosity of the gelatin, which characteristics are generally desired to be kept at a high level.

It is an object of this invention to provide a process for clarifying or fining a gelatin solution.

It is a further object of this invention to provide a process for clarifying or fining a gelatin solution containing metallic ions and organic contaminants to produce a gelatin product having superior clarity, a reduced content of trace metals and a lowered ash content.

It is a still further object of this invention to provide a process for the treatment of a gelatin solution to obtain a clarified, essentially turbidity- and haze-free gelatin solution wherein the disadvantages of various prior art methods are overcome or substantially eliminated.

As used herein, the term "fining" is defined as one in which a gelatin extract or solution is improved in clarity and color by precipitating therein a crystalline mass. During precipitation, the crystalline mass serves to remove various impurities and contaminants and to improve the color and clarity of the gelatin extract or solution. The resultant dried gelatin product is found to have a desirably low ash content. Precipitation, however, may be further understood in the light of the present specification as also including any one or combination of several phenomena such as occlusion, coprecipitation, absorption, adsorption, etc.

In accordance with the present invention, it has now been unexpectedly discovered that a gelatin extract or solution containing metallic ions and organic contaminants may be effectively treated by a fining process involving:

(1) Adding to a gelatin solution having a pH of at least about 6.0 a soluble carbonate selected from the group consisting of alkali metal and ammonium carbonates, (2) Adjusting the pH of said solution to about 8.0 to 10.0 whereby a carbonate precipitate of metallic ions forms, and (3) Separating said precipitate together with coprecipitated and occluded contaminants from said solution.

The gelatin solution to be treated according to the process of this invention may be a solution that is recovered at late stage, e.g. after evaporation, in the overall process, usually just prior to drying. However, the gelatin solution may also be obtained by dissolving dry product gelatin in water to form a solution having approximately the same concentration as a solution obtained at the evaporation stage. Gelatin solutions having a concentration of about 10–30%, typically 20%, gelatin are advantageously treated by this process, although it is apparent that lower concentrations are also suitable.

The gelatin which may be treated according to the process of this invention may be one which has been prepared by either the so-called acid process or alkaline or lime process, that is, either type A or type B gelatin. Especially advantageous results appear to be evidenced by employing gelatin which has been obtained from lime processed cattle or calf hides, typically tanners' stock, and from ossein. It will be apparent that depending upon the source materials as well as the processing conditions used to extract the gelatin, greater or lesser amounts of metallic ions and organic contaminants will be found therein. Thus, for example, gelatin which has been extracted and recovered from pig skins treated by the so-called acid process will generally contain substantially less calcium, or other alkaline earth metals whose carbonate salts are essentially insoluble than a gelatin which has been recovered from lime tanners' stock or ossein.

Prior to the addition of carbonate, the pH of the gelatin solution is adjusted, if necessary, to at least about 6.0 employing a suitable base such as an alkali metal or ammonium hydroxide or by an anion exchange, etc. Such pH control is desirable in order to prevent decomposition of the carbonate.

Suitable soluble carbonates include the alkali metal and ammonium carbonates and bicarbonates. Thus, when reference to "carbonate" appears herein, such term is to be construed to also include bicarbonate. Of the soluble carbonates and bicarbonates which may be employed, the use of ammonium carbonate is especially preferred because of the volatility of the cation portion thereof, i.e., $NH_4^+$. Thus, its use does not result in the introduction of cations whose presence may serve to actually increase the ash content of the gelatin to be processed.

The amount of carbonate added, is, of course, dependent upon the degree of clarity and level of ash content desired of the final gelatin product. Ordinarily, an amount of carbonate from about 1 to 10%, preferably 3 to 6%, based upon the weight of dry gelatin in solution is satisfactory.

Following the addition of a soluble carbonate, the pH of the gelatin solution is then adjusted to about 8.0 to 10.0, preferably 8.5 to 9.5, with a suitable base. Preferably, the base is one which is volatile as, for example, ammonia, ammonium hydroxide or the like. However, alkali metal and alkaline earth metal hydroxides such as calcium hydroxide, sodium hydroxide, potassium hydroxide, barium hydroxide, magnesium hydroxide, and the like may be used. It will be apparent, however, that the use of alkaline earth metal hydroxides for pH adjustment is not especially desired since the addition of such bases has the effect of forming a precipitate from reagents that are added rather than a precipitate with those metallic ions which are present in the gelatin solution to be treated.

Subsequently, a carbonate precipitate of metallic ions, principally calcium carbonate, forms in the gelatin solution. Together with the carbonate precipitate, which appears to be reasonably stable, that is, non-redissolving at pH 8.0 to 10.0 of the gelatin solution, coprecipitated and occluded contaminants are carried down from the gelatin solution. Such coprecipitated and occluded materials may include metallo-protein complexes, colloidally dispersed impurities, etc.

If desired, precipitation may be acomplished in the presence of a small amount of a nucleation aid or flocculating agent. However, the use of such is not essential. Typical nucleation aids and flocculating agents include aluminum silicate, silica, diatomaceous earth, clays, wood pulp, alpha-cellulose and the like.

Following the precipitation step, the gelatin solution is filtered, preferably employing a filtration aid such as, for example, aluminum silicate, silica, diatomaceous earth, clays, wood pulp, alpha-cellulose and the like. Alternatively, the precipitate may be separated from the fined gelatin solution by centrifugation, decantation, or the like although such procedures are less desirable. If desired, the gelatin solution may be further processed by treating the same with bleaching agents, color removal aids, and odor reducing bodies.

The temperature at which the several steps of the fining process may be carried out is usually in the range of 100° to 150° F., most preferably, from 110° to 130° F. The time for the overall process is dependent upon the degree of clarity that is desired in the gelatin solution and the amount of metallic ion and organic contaminants that may be present in the gelatin solution. Ordinarily, a total processing time of from about 15 minutes to two hours is adequate.

The gelatin is recovered by conventional means, i.e., evaporated, chilled, dried and comminuted.

The gelatin product prepared in accordance with the process of this invention is unexpectedly characterized by its superior clarity and considerably reduced amounts of iron, calcium, chromium, lead and other trace metallic ions usually present in gelatin. Moreover, the lowering of the level of certain metals, for example, chromium and lead, also serves to decrease or eliminate a possible toxicity problem while the reduction in the amount of organic contaminants results in excellent freedom from haziness in solutions prepared from the gelatin product. When ammonium salts are used, the gelatin product is further noted for its extremely low ash content. Yet, such desirable objectives are obtained without undesirable loss of gelatin or of the desired properties such as viscosity and bloom.

Thus, the process of the present invention affords a reduction in the iron content of gelatin to below about 15 parts per million, results in lowering the ash content by approximately 80%, and the calcium content by greater than 90% and markedly improves the clarity of a gelatin solution regardless of the source material of the gelatin. Gelatin from tanners' stock is particularly noted to be improved by this process. It further appears that the use of carbonate is more attractive than many prior art clarification methods because of the crystalline, readily filterable precipitate that is formed in the gelatin solution and of the preservation of gel strength and viscosity of the gelatin.

In order to more fully illustrate the practice of the present invention but without limiting it thereto, the following examples are given:

*Example 1*

Lime processed tanners' stock is extracted in a conventional manner to yield a gelatin solution which is then vacuum concentrated to 20% gelatin solids. A first sample is taken and is chilled and dried. The sample, upon analysis, is shown to have an iron content of 81 parts per million, a total ash content of 1.49%, and calcium content of .805% as calcium oxide. A second sample of the concentrate is pressure filtered. A portion of the filtrate is diluted with water to a 6⅔% concentration. This solution is characterized by its poor clarity and turbid appearance. Another portion of this same filtrate is chilled and dried to obtain a gelatin product having a moisture content of 10%. This product is, upon analysis, shown to have an iron content of 32.3 parts per million, an ash content of 1.50% and a calcium content of .772% as calcium oxide.

(a) To the 20% gelatin solution maintained at 110° F. and pH of 6.2 is added with agitation an aqueous solution of ammonium carbonate in an amount equivalent to 2% based upon the weight of gelatin solids. Ammonium hydroxide is then added to raise the pH to 8.8. The solution became more turbid because of the formation of insoluble calcium carbonate and was then pressure filtered through a metal-free filter employing diatomaceous earth filter aid. The effluent from the filter is substantially colorless and has a very high degree of clarity. The filtered solution was evaporated to 33% concentration, chilled and air dried. During evaporation and drying, ammonia is released from the solution and the dry finished gelatin is noted to have a pH of 6.7, a level generally desired. The iron content of the gelatin is found to be 15.6 parts per million, the ash content 0.93% and the calcium content .417% as calcium oxide.

(b) The procedure of (a) is repeated in all essential respects except that an aqueous solution of ammonium carbonate equivalent to 4% based on the weight of gelatin is employed. A high degree of clarity in the filter effluent is again observed and the iron and ash contents of the dry finished gelatin are, respectively, 13.3 parts per million and 0.30% and the calcium content is 0.054% as calcium oxide.

(c) The procedure of (a) is repeated in all essential respects except that an aqueous solution of ammonium carbonate equivalent to 6% based on the weight of gelatin is employed. Results similar to those obtained in (b) are noted where iron is 13.2 p.p.m., ash is 0.26% and calcium is 0.023% as calcium oxide.

A series of runs were made on other gelatin solutions following the procedure described in the foregoing example. The results of all examples are tabulated as follows:

I. Measured Iron Levels in Ammonium Carbonate Treated Gelatin:

| Example | Untreated Gelatin (Feed) | Simple Filtration | Ammonium Carbonate Treated | | |
|---|---|---|---|---|---|
| | | | 2% | 4% | 6% |
| | Iron, p.p.m. | Iron, p.p.m. | Iron, p.p.m. | | |
| 1 | 81 | (a) 32.3 | (b) 15.6 | (c) 13.3 | 13.2 |
| 2 | 61 | (a) 20.0 | (b) 15.2 | (c) 13.6 | 3.4 |
| 3 | 27 | 11.7 | | 6.2 | |
| 4 | 45 | 40.0 | | 15.6 | |
| 5 | 15.4 | 7.5 | | 5.1 | |
| 6 | 19.1 | 9.4 | | 8.4 | |
| 7 | 14.8 | 10.1 | | 8.5 | |
| 8 | 36.0 | 23.0 | | 15.0 | |
| 9 | 19.0 | 18.0 | | 7.4 | |
| 10 | 53 | 21.0 | | 18.0 | |
| 11 | 17 | 17.0 | | 13.7 | |
| 12 | 31 | 32.0 | | 13.2 | |
| Average: | | | | | |
| (2) | 71 | 26.1 | 15.4 | 13.5 | 9.8 |
| (12) | 33.2 | 20.2 | | 11.5 | |

II. Measured Calcium Levels in Ammonium Carbonate Treated Gelatin:

Average (7) Untreated gelatin =0.67%.
Average (7) Ammonium Carbonate (4%) treated gelatin =0.049%.

III. Measured Ash Levels in Gelatins Treated with 4% Ammonium Carbonate:

Average (7) Feed (untreated) gelatin =1.76% ash.
Average (7) Ammonium Carbonate (4%) treated gelatin =0.33% ash.

IV. Measured Levels of Chromium and Lead in Example 1, above Treated with 4% Ammonium Carbonate:

| | Chromium (p.p.m.) | Lead (p.p.m.) |
|---|---|---|
| Untreated gelatin | 5.9 | 6.0 |
| Treated gelatin | 1.7 | 0.8 |

V. Observed Clarities: Clarity of gelatin filtrates, observed at 6⅔% concentration, in all cases where ammonium carbonate was used was superior to those of untreated gelatin filtrates.

The above-tabulated data indicates that the iron content of gelatin fined in accordance with the process of this invention may be reduced to approximately 15 parts per million which level is about 40% below that of the iron content in gelatin filtered by conventional technique and about 65 to 85% below that of the iron content in untreated gelatins. Similarly, marked lowering of the amounts of calcium, chromium and lead present in untreated gelatin is noted, with reductions of approximately 90%, 70% and 85%, respectively, being observed. Also significant is the approximately 80% reduction in ash content of untreated gelatins which are fined in accordance with the process of this invention. The distinct improvement in clarity for gelatins so processed is also apparent.

While the present invention has been described in conjunction with various preferred embodiments, it is to be understood that it is not to be merely and so restricted thereto. It will be apparent that numerous modifications and advantages of the invention will be obvious and, therefore, no limitations should be set therein except insofar as they appear in the appended claims.

We claim:
1. A process of fining a gelatin solution containing metallic ions and organic contaminants consisting of:
   (a) adding to said solution having a pH of at least about 6.0 a carbonate selected from the group consisting of soluble alkali metal and ammonium carbonates;
   (b) adjusting the pH of said solution to about 8.0 to 10.0, whereby a carbonate precipitate of metallic ions forms; and
   (c) separating said precipitate together with co-precipitated and occluded contaminants from said solution.
2. The process of claim 1 in which said carbonate is ammonium carbonate.
3. The process of claim 5 in which the pH is adjusted employing a compound selected from the group consisting of ammonium, alkali metal and alkaline earth metal hydroxides and ammonia.
4. The process of claim 3 in which said compound is ammonium hydroxide.
5. A process of fining a gelatin solution containing metallic ions and organic contaminants consisting of:
   (a) adding to said solution having a pH of at least about 6.0 a carbonate selected from the group consisting of soluble alkali metal and ammonium carbonates;
   (b) adjusting the pH of said solution to about 8.0 to 10.0, whereby a carbonate precipitate of metallic ions forms; and
   (c) separating said precipitate together with co-precipitated and occluded contaminants from said solution by means of filtration, employing a filter aid.

References Cited

UNITED STATES PATENTS 3,244,689   4/1966   Huntoon et al. _____ 260—118

OTHER REFERENCES

Inorganic Chemistry, Ephraim, 1943, pp. 801–805 (excerpt in 260–118).

WILLIAM H. SHORT, *Primary Examiner.*

H. SCHAIN, *Assistant Examiner.*